United States Patent
Burke

(10) Patent No.: US 6,893,572 B2
(45) Date of Patent: May 17, 2005

(54) SOLIDS ACCUMULATING FLOTATION SEPARATOR

(75) Inventor: Dennis A. Burke, Olympia, WA (US)

(73) Assignee: Western Environmental Engineering Company, Olympia, WA (US)

( * ) Notice: Subject to any disclaimer, the term of this patent is extended or adjusted under 35 U.S.C. 154(b) by 326 days.

(21) Appl. No.: 10/194,451

(22) Filed: Jul. 11, 2002

(65) Prior Publication Data

US 2003/0052061 A1 Mar. 20, 2003

Related U.S. Application Data

(60) Provisional application No. 60/305,222, filed on Jul. 12, 2001.

(51) Int. Cl.[7] .............................. C02F 1/24; C02F 11/12
(52) U.S. Cl. ...................... 210/703; 210/709; 210/744; 210/806; 210/221.2
(58) Field of Search .............................. 210/703, 709, 210/744, 806, 221.2

(56) References Cited

U.S. PATENT DOCUMENTS

| | | | |
|---|---|---|---|
| 3,012,670 A | 12/1961 | Ziemer | |
| 3,175,687 A | 3/1965 | Jones | |
| 3,418,236 A | 12/1968 | Mail | |
| 3,446,488 A | 5/1969 | Mail | |
| 3,705,650 A | 12/1972 | Gotte | |
| 3,738,784 A | 6/1973 | Clark et al. | |
| 3,772,190 A * | 11/1973 | Eisenmann | 210/703 |
| 3,842,004 A | 10/1974 | Nagahama | |
| 3,870,635 A * | 3/1975 | Clarke-Pounder | 210/218 |
| 3,959,131 A | 5/1976 | Ramirez et al. | |
| 3,966,598 A | 6/1976 | Ettelt | |
| 4,022,696 A | 5/1977 | Krofta | |
| 4,076,515 A | 2/1978 | Rickard | |
| 4,079,008 A | 3/1978 | Neumann | |
| 4,100,066 A * | 7/1978 | Bloomer et al. | 210/703 |
| 4,251,361 A | 2/1981 | Grimsley | |
| 4,490,248 A | 12/1984 | Filippov et al. | |
| 4,510,057 A | 4/1985 | Rowe et al. | |
| 4,534,862 A | 8/1985 | Zlokarnik | |
| 4,559,146 A | 12/1985 | Roets | |
| 4,563,274 A * | 1/1986 | Rothon et al. | 210/101 |
| 4,564,457 A * | 1/1986 | Cairo et al. | 210/704 |
| 4,931,175 A | 6/1990 | Krofta | |
| 5,080,802 A * | 1/1992 | Cairo et al. | 210/703 |
| 5,151,177 A | 9/1992 | Roshanravan et al. | |
| 5,156,745 A | 10/1992 | Cairo, Jr. et al. | |
| 5,310,485 A | 5/1994 | Roshanravan | |
| 5,354,458 A * | 10/1994 | Wang et al. | 210/180 |
| 5,382,358 A | 1/1995 | Yeh | |
| 5,437,785 A | 8/1995 | Roshanravan | |
| 5,462,669 A | 10/1995 | Yeh | |

(Continued)

FOREIGN PATENT DOCUMENTS

| | | |
|---|---|---|
| GB | 2058735 A | 4/1981 |
| JP | 60-064684 A | 4/1985 |
| JP | 6-71293 A | 3/1994 |

*Primary Examiner*—Thomas M. Lithgow
(74) *Attorney, Agent, or Firm*—Christensen O'Connor Johnson Kindness PLLC

(57) ABSTRACT

The invention is directed to a method for flotation separation. The method has the steps of feeding an influent stream containing liquids and solids to a vessel, while removing clarified liquid at the same time as the feeding process. The method employs a step for emptying the solids from the vessel based on the solids having formed a float blanket of a predetermined depth. The solids are removed from the vessel through a bottom nozzle as opposed to being skimmed off the top surface with mechanical separators. The depth of the float blanket can be monitored. Once it is determined that the float blanket has reached the predetermined depth, the feed to the vessel is stopped and the vessel is emptied of liquids and solids through a suitable outlet other than the feed inlet, by an arrangement of valves and lines.

14 Claims, 6 Drawing Sheets

U.S. PATENT DOCUMENTS

| | | |
|---|---|---|
| 5,538,631 A | 7/1996 | Yeh |
| 5,660,718 A | 8/1997 | Chudacek et al. |
| 5,766,484 A | 6/1998 | Petit et al. |
| 5,846,413 A | 12/1998 | Krofta |
| 6,126,815 A | 10/2000 | Kelada |
| 6,299,774 B1 | 10/2001 | Ainsworth et al. |
| 6,464,875 B1 | 10/2002 | Woodruff |
| 6,569,332 B2 | 5/2003 | Ainsworth et al. |
| 6,616,844 B2 | 9/2003 | Park et al. |
| 2001/0020603 A1 | 9/2001 | Moorehead et al. |
| 2003/0141244 A1 | 7/2003 | Hansen et al. |

* cited by examiner

SOLIDS ACCUMULATING FLOTATION SEPARATOR

CROSS-REFERENCE TO RELATED APPLICATION

This application claims the benefit of provisional U.S. Application No. 60/305,222, filed Jul. 12, 2001, the disclosure of which is fully incorporated herein by reference.

FIELD OF THE INVENTION

This invention is directed to solids separators, and more particularly, to a flotation separator which does not include mechanical means for removing the float blanket from the separator vessel but accumulates solids to form a float blanket having a predetermined depth.

BACKGROUND OF THE INVENTION

There is a need for a simple, inexpensive high rate liquid/solid separation apparatus and method to abate pollution from agriculture and urban point and non-point sources. A large number of liquid/solid separation techniques are used in the wastewater treatment industry. In the selection of a suitable separation apparatus and method for a given application, the surface-loading rate of the system is often important to the design. The surface-loading rate is generally reported in gallons per square foot per day (gal/$ft^2$/day) for dilute flows or in pounds of dry solids per square foot per day (lb/$ft^2$/day) for concentrated flows (suspended solids >0.1%). Hydraulic loads are important to the design of the separator when, for instance, turbulence inhibits the necessary separating action. If solids removal is important, then solids loading should be the design criteria. Most conventional flotation separators are desired to have high solids surface loading capacity, yet are unable to achieve this for reasons which will be explained below. A separation process is also selected based on its ability to remove a wide variety of pollutants such as oil and grease, bacteria, colloidal, and suspended solids.

Separation using principles of buoyancy (i.e., flotation separation) is advantageous because it achieves high capture rates while producing a clean effluent. Flotation separation can also concentrate the waste (or recycle) solids. Concentrated waste streams are desirable to minimize the size of downstream processing facilities. Flotation separation has also been successfully used for the efficient removal of suspended solids, colloids, oil and grease (O&G), nutrients, bacteria, organic acids, algae, cryptosporidium, etc.

Conventional flotation separation, however, is considered a complex process, involving gas saturation and injection accompanied by both surface and bottom solids removal apparatus. Recently, the development of an efficient, yet simple, saturator pump has reduced the complexity of the process. However, where the influent waste stream results in a low solids loading rate (<50 lb/$ft^2$/day), the vessel needed to carry out acceptable flotation separation tends to be excessively large.

The maximum hydraulic loading design rate for typical flotation separators is about 5,760 gal/$ft^2$/day (4 gpm/$ft^2$). In actual practice, the flotation separation process may, however, be limited by its solids surface loading rate if the solids concentration of the influent stream is high. This is especially true if the process is used for thickening as opposed to clarification. Thickening refers to concentrating solids to a smaller volume, where clarification generally refers to removing solids. The maximum solids loading rate for conventional flotation separation methods is about 50 lb/$ft^2$/day. Thus, according to FIG. 1, at the maximum design hydraulic loading, the allowable concentration of solids of a typical flotation separator is about 0.1%. However, in actuality, the solids concentration may be much higher, and consequently the typical flotation separator is operating below its maximum hydraulic load. Thus, in almost all circumstances, typical flotation separators are designed and operated to achieve their maximum solids surface load capacity of about 50 lb/$ft^2$/day.

Maximizing the float solids concentration is advantageous since the solids concentration will determine downstream processing resources and cost. If the solids produced are dilute, the downstream dewatering or disposal costs will increase. If the separator is used in a biological process incorporating solids recycle, the processing cost and reactor size will be much greater if dilute solids are produced. FIG. 2 shows how the processing costs increase as the separator's concentration efficiency decreases.

It is desirable to improve the existing flotation separators because the advantages of flotation separation as a method for concentrating waste streams are numerous. Flotation separation can be used for both clarification and thickening. Flotation separation can remove suspended solids, colloids, and oil and grease at the same time. If reagents are added to the flotation stream, nutrients can be removed and consolidated with the solids. If polymers are used, bacteria and a variety of other organisms will be removed. If air is used, the effluent liquid will be aerated. If gas is used, a variety of physical and chemical processes can be implemented. Flotation takes advantage of the hydrophobic interactions that are lacking in other separation technologies.

One attempt to improve flotation separation is proposed in U.S. Pat. No. 6,126,815, to Kelada. Kelada discloses a zero pool velocity flotation separation process and separator vessel. The vessel according to Kelada has a single nozzle for receiving the waste fluid and solids, and for discharging the solids float blanket. In other words, Kelada charges the separator vessel with an amount of liquid waste containing solids. The initial charge is allowed to consolidate for a set period during which no other streams are introduced into the vessel or removed from the vessel. During the consolidation period, the solids rise to the surface and form a blanket of solids. Depending on the amount of consolidation time, the density of the blanket of solids can vary. However, since waste liquids are shut off after one tank volume is charged into the separator vessel, the maximum amount of solids that can be removed is predetermined and cannot exceed that which was initially charged into the separator vessel. As such, the surface loading (lb/$ft^2$/days) capabilities achieved by this apparatus are low.

It is desirable to produce a flotation separator apparatus and method capable of increasing the solids surface loading capabilities beyond what is presently accepted as the maximum. Such an apparatus would have a smaller footprint than conventional flotation separator vessels, thus making it highly economical. The apparatus disclosed herein fulfills such needs.

SUMMARY OF THE INVENTION

One embodiment of the invention is directed to a method for flotation separation. The method has the steps of feeding an influent stream containing liquids and solids to a vessel, while removing clarified liquid at the same time that the feeding process is being conducted. The method employs a step for emptying the solids from the vessel based on the solids having formed a float blanket of a predetermined depth. The solids are removed from the vessel through a bottom nozzle as opposed to being skimmed off the top surface with mechanical collectors. Conventional separators use overflow weirs or scrapers to remove the float blanket. In one embodiment of the invention, the depth of the float blanket can be monitored. The float blanket is allowed to accumulate to a predetermined depth. Once it is determined that the float blanket has reached the predetermined depth, for example, by activating a high level switch, the feed to the vessel is stopped and the vessel is emptied of liquids and solids through a suitable bottom outlet other than the feed inlet by an arrangement of valves and lines. The valves can be automated to simplify the emptying process based on input from level monitoring devices, turbidity meters, optical sensors, optical reflectors, density meters and the like.

In another embodiment of the invention, a flotation separator apparatus is disclosed. The flotation separator apparatus has a vessel used for accumulating a float blanket without any surface or bottom collectors. The apparatus also has means for monitoring the depth of the float blanket. The means for monitoring the float blanket can include an interface transmitter, a level transmitter, a level switch, or like devices. In one embodiment, the apparatus includes means for monitoring the interface of a float blanket and means for signaling that the float blanket has reached a predetermined depth. When the float blanket reaches a predetermined depth by activating an electrical instrument, certain processes are initiated, including stopping feed to the vessel.

The apparatus according to the invention accumulates solids to form a float blanket until a predetermined depth is reached before removing the solids from the vessel. Previous flotation separation systems failed to recognize the importance of continuous accumulation of float solids to reach a certain depth. In one embodiment of the invention, the float blanket depth is a factor in determining when to remove the solids. Higher depth float blankets mean more concentrated solids because of the greater weight placed on the float blanket. Conventional flotation separators remove solids based on mechanical constraints, such as the speed of collectors, weir heights, scraper height, etc. It has been found that removing these constraints, as is provided for in the apparatus according to the invention, results in much higher solids surface loading capabilities. The recognition of problems with conventional apparatus has led the inventor to develop the newer apparatus and methods described herein.

In another embodiment, any number of flotation separator apparatus according to the invention can be combined in a system, so as to provide substantially continuous influent waste stream processing. For example, one flotation separator in a group of separators can be accumulating solids while the other separators are in different modes such as filling or emptying. When the solids have accumulated into a float blanket having a predetermined depth in one vessel, the waste stream can be directed to a different separator, and the previous separator can be emptied.

One embodiment of an apparatus of the invention is a continuous flow-through solids flotation separator. The solids are allowed to accumulate in the separator while receiving waste in one or more inlet and discharging clarified liquid effluent via a separate and distinct outlet, thus, accumulating solids and achieving a blanket depth which has heretofore not been considered to be important. Accordingly, the separator vessel has an inlet for the solid/liquid waste and an outlet for the clarified liquid effluent and clarified liquid to the saturator, thus achieving a flow-through solids flotation separator. The inlet and outlet are apart from one another. The inlet and outlet are spaced away from each other so as to minimize the possibility that solids from the inlet will flow to the outlet, thus not providing the opportunity for solids to be captured in the float blanket. To this end, in one embodiment, the separator vessel has an inlet in the center lower portion of the vessel and an outlet at the periphery of the vessel. In another embodiment, the separator vessel has an inlet at the periphery of the vessel and an outlet at the central lower portion of the vessel. The accumulated solids float blanket may be removed from the central portion of the vessel. The surface loading of the solids flotation separator can be increased as compared with conventional flotation separators. The area footprint of the solids flotation separator according to the invention is dramatically reduced over what conventional flotation separators require to process the same amount of solids surface loading.

The surface loading rates of the separator apparatus can be increased from the conventional 50 lb/ft$^2$/day. In some instances, up to 200 lb/ft$^2$/day or more. These rates are considerably greater than the rates for other separation techniques. However, the separator apparatus can operate at any rate.

The separator apparatus according to the invention will have a wide variety of applications. Their use may range to the removal of solids and phosphorus from the effluent of small wastewater treatment facilities or lagoons. For example, in Washington, Oregon, and Idaho, the removal of phosphorous from both municipal and industrial treatment facilities is expected to soon be mandatory. An economical method for precipitating and removing phosphorus colloids is required. The separator will be a highly effective method of removing nutrients. The removal of nutrients, oil and grease, and particulate matter from storm water is also a priority for many facilities. In many cases, sufficient land is not available to install storm treatment facilities.

One advantage of the separator apparatus of the invention is that it can reduce by a factor of ½ to 5 the land footprint as compared with conventional separators and thus, reduce the cost of separation. It also reduces the complexity associated with most flotation separators. The operation and maintenance of the separator apparatus according to the invention can be easily automated with the use of a computer or programmable logic controllers. It is expected that the capital expenditures and operating costs will be substantially reduced.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
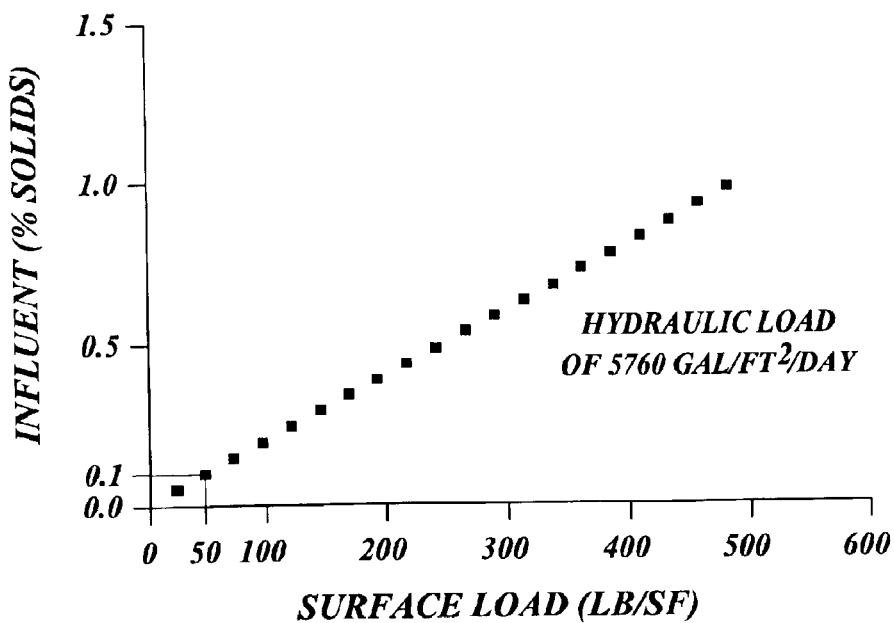
FIG. 1 shows a graphical illustration of the expected surface mass loading at various influent solids concentrations for a hydraulic loading rate of 5760 gal/ft$^2$/day.
Figure 2:
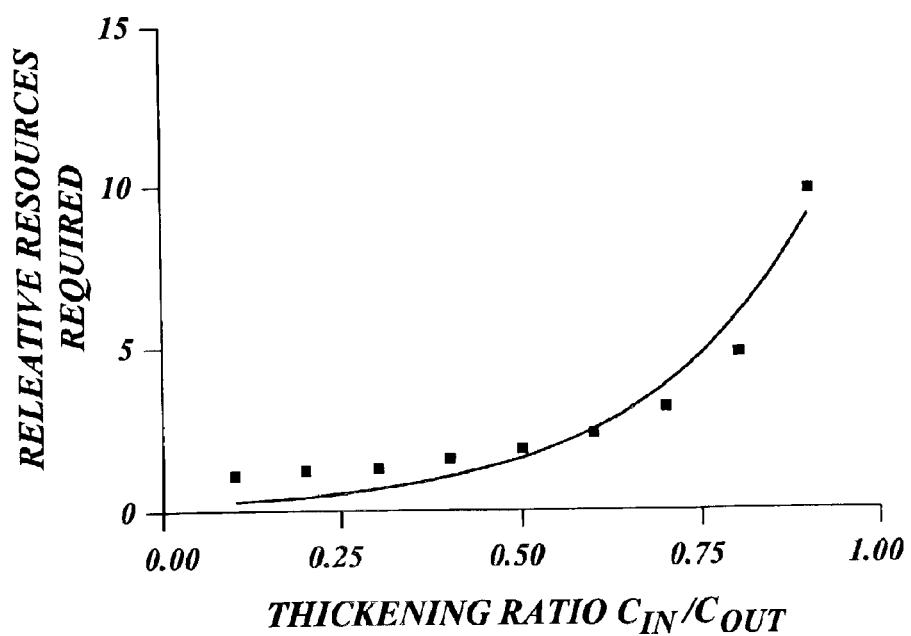
FIG. 2 shows a graphical representation of the benefit of achieving low thickening ratios.

The flotation separation apparatus of the present invention is a simple and economical flotation separator that will achieve high solids surface loading rates (small footprint) and operates, in one embodiment, with a single motor driven saturator device (exclusive of the influent, and effluent pumps, if required). The flotation separator is suitable for any one of many applications, such as storm water, combined sewer overflow, and wastewater treatment processes and the like. The flotation separator of the present invention has no surface and bottom mechanical collectors, yet has the following advantages. The flotation separator of the present invention maximizes the float solids concentration ($C_{fs}$= pounds of dry solids per cubic foot of float). The flotation separator of the present invention maximizes solids capture in the float and thereby increases effluent clarity. The flotation separator increases solids surface loading and thereby reduces the size and cost of the separator. The flotation separator eliminates the complexity associated with surface and bottom solids mechanical collectors.

Not intending to be bound by theory, the float blanket produced during flotation separation in conformance with one embodiment of the invention are concentrated by remaining on the surface of the water for a prolonged period of time. The flotation process creates a mass of solids having a density less than water. The quantity of gas entrapped in the mass establishes the float density. The solid mass acts as an "iceberg" with a portion of the solids remaining out of the water. The lower density resulting from entrapped gas within the solids blanket, determines the mass protruding from the water's surface. The mass protruding from the water surface drains and provides pressure on the float solids, thereby increasing the solids concentration of the float blanket. A deep float blanket has more mass above the liquid level, which places greater consolidation pressure on the float blanket. The flotation separator according to the invention provides more time for the consolidation and drainage to occur. The present separator apparatus allows accumulation of solids for a prolonged period of time as compared to conventional flotation separators that do not take accumulation into consideration.

High solids surface loading rates are contrary to the goal of obtaining high float solids concentrations and effluent clarity in conventional flotation separators. However, there is no limitation on the pounds of solids per square foot that can be applied to a flotation separator of the present invention. Solids loadings of greater than 50, 100, 150 and even 250 lb/ft²/day have been applied to a flotation separator made according to the invention. During trials to test the concepts embodied herein, it was established that a conventional mechanical flotation separator is limited by the rate of concentrated solids (float) removal rather than the rate of solids delivery to the separator. The method and apparatus according to the invention eliminates the mechanical collectors to thereby increase the solids loading capacity.

The removal of float solids is directly related to the maximum surface-loading rate. The solids removed can be expressed mathematically by the following expression:

$$P_R = (A_{FS})(D_{FB})(\Delta_{SC})(\gamma_{FB})$$

Where:
$P_R$=Pounds of Dry Solids Removed (per day or hour)
$A_{FS}$=Area of Flotation Surface
$D_{FB}$=Depth of Flotation Blanket
$\Delta_{SC}$=Number of Surface Cleanings (per day or hour)
$\gamma_{FB}$=Dry Solids Concentration of Flotation Blanket (Pounds per cubic foot)

The surface loading is expressed as follows:

$$\frac{P_R}{A_{FS}} = (D_{FB})(\Delta_{SC})(\gamma_{FB})$$

As indicated, the surface loading is directly related to the depth of the flotation blanket, the solids concentration of the blanket and the number of surface cleanings performed per day, or hour. The dry solids concentration of the flotation blanket is inversely related to the number of surface cleanings. In order to achieve a dense float blanket, time is required for the float to consolidate. Consolidation is achieved by allowing the float blanket to remain on the surface for the period of time until a predetermined float blanket depth has been achieved. Frequent surface cleanings as is typical of conventional mechanical flotation separators result in less consolidation which produces lower solids concentrations. There are also limitations to the maximum float depth that can be achieved utilizing existing flotation separators with mechanical separators. Therefore, typical mechanical flotation separators cannot simply be skimmed less often to increase the depth of the float blanket.

Figure 3:
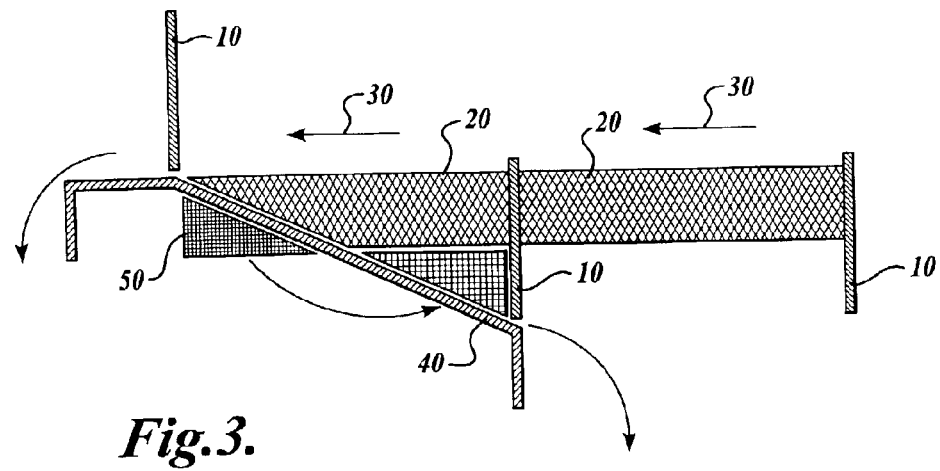
FIG. 3 shows a schematic illustration of the float blanket removal process according to conventional techniques.

Referring now to FIG. 3, a cross sectional schematic illustration of a conventional mechanical top collector for a flotation separator is illustrated. It is understood that only a portion of the mechanical separator is shown. Mechanical removal of float blanket solids is undesirable because the float blanket depth is not allowed to accumulate beyond the constraints of the mechanical system used to remove it. The inventor theorizes that accumulating solids to a much greater float blanket depth within a flotation separator vessel by continually feeding the vessel with waste influent and continuous removal of clarified effluent will produce positive results. As illustrated in FIG. 3, the mechanical collector of conventional separators includes a series of scrapers 10. The scrapers 10 can be connected on an endless drive which continually moves the scrapers 10 along the upper portion of the vessel. The scrapers 10 move the float blanket solids 20 along the surface in the direction of the arrows 30. The scrapers 10 move the solids 20 along the surface and up the discharge ramp 40 and over the edge. As the float blanket 20 hits the discharge ramp 40, it must conform to the shape of the ramp 40. A portion of the blanket 50 is pushed down below the original blanket 20 as a displaced wedge. As a result of the ramp 40, the blanket 20 has twice the depth due to the displacement of the portion of the blanket 50. Consequently, the optimal float blanket depth is only half the height of the scrapers.

The depth of the solids blanket is a variable in conventional mechanical flotation separators, meaning it is not a controlled variable. The scraper speed can, however, be adjusted. If the blanket is not as deep as the scraper depth design, the scraper will remove water with the solids, diluting the removed solids concentration. If the blanket is deeper than the design of the scrapers 10, solids will be pushed into the flotation unit as "fall-out" leading to poor solids capture. To achieve high solids concentrations (no excess water) and high effluent clarity (solids capture), the collector speed needs to be precisely controlled so that the float blanket conforms to the scraper and discharge ramp design. Thus, for any mechanical flotation separator, the float blanket depth is fixed.

It should be noted that the height of the scraper is twice the depth of the float blanket. If the float blanket is one foot thick the scraper flight must be two feet deep. Consequently, the maximum economical and feasible scraper height will determine float blanket depth and as a result, the surface loading to the flotation separator. For a variety of reasons surface collectors should not exceed two feet in depth. The resulting blanket depth of conventional flotation separators is 1 foot and the surface loading is consequently less than 35 lb/ft$^2$/day.

According to one embodiment of the present invention, the float blanket depth ($D_{FB}$) can, however, be increased. In some embodiments, the float blanket depth is greater than 3 feet. In other embodiments, the float blanket depth is 3 feet to 12 feet. Increasing the float blanket depth will increase the surface-loading rate, increase the solids concentration and reduce the size of the flotation separator. Accumulating solids within the separator apparatus vessel continuously until reaching a predetermined float blanket depth and/or operating it as a sequencing batch reactor can substantially increase the solids removal rate. For example, if one operated a separation vessel with a cycle time equal to the solids clean time ($\Delta_{SC}$) and increased the hydraulic load to the unit four-fold, the accumulated blanket depth would be four times the original depth, assuming the concentration remains the same. Upon reaching the predetermined float blanket depth, the flow would be transferred to another unit while the original unit would be emptied. The net effect would be a surface loading twice the surface loading of conventional separators. In one embodiment of the solids accumulating separator of the invention, the solids surface loading is increased to the hydraulic loading limitations.

Figure 4:
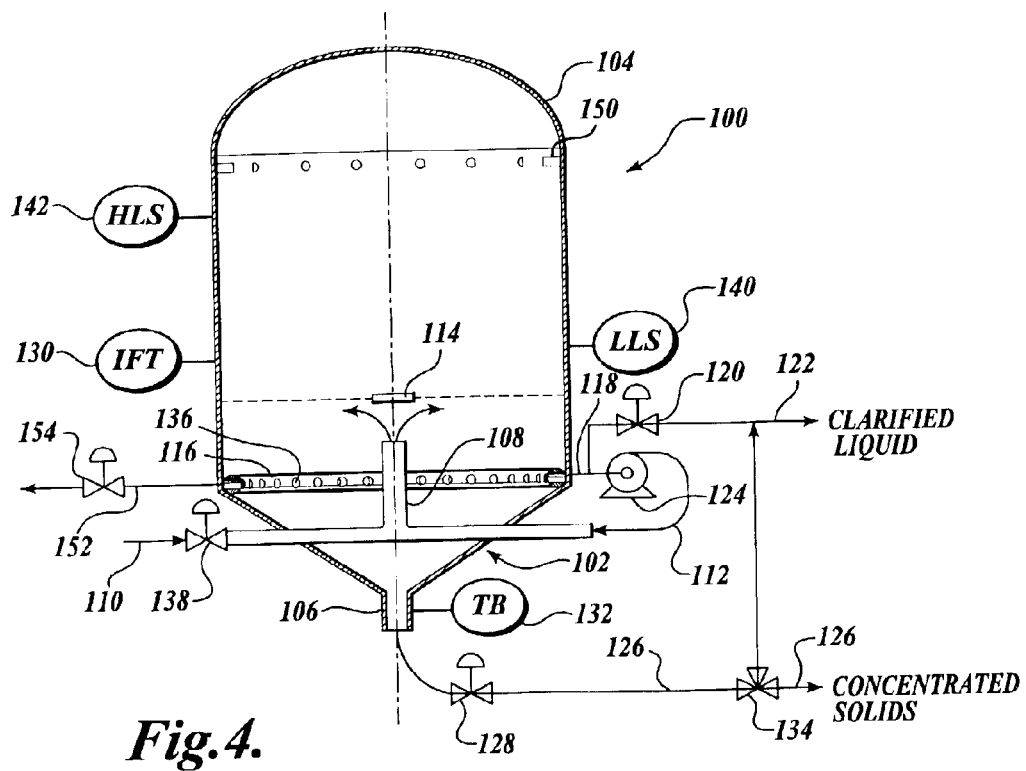
FIG. 4 shows an illustration of an embodiment of a solids accumulating flotation separator according to the present invention.

Referring now to FIG. 4, a solids accumulating flotation separator apparatus 100 according to the present invention is illustrated. The flotation separator uses no float or bottom collectors. Consequently, the separator 100 is simple in construction and operation. The separator 100 is a vessel having a conical shaped bottom portion 102 or hopper connected to a cylindrical body used to accumulate solids into a float blanket. In one embodiment, the vessel 100 can have a dome 104 enclosing the vessel 100 at the upper end thereof. A nozzle 106 is provided at the center of the conical portion 102. Nozzle 106 is connected to an effluent line 126 which can be used for the removal of stored liquid and accumulated solids, such as the float blanket or settled solids.

The vessel 100 includes a contact chamber 108. In one embodiment, the contact chamber 108 is provided within the interior of the vessel 100 at a central location thereof. One end of the contact chamber empties into the interior of the vessel 100. The contact chamber 108 has a connection for a waste stream line 110. Stream 110 can contain both liquids and solids. Stream 110 contains the solids desired to be concentrated and/or removed from the liquid. A second connection to the contact chamber 108 is made to a gas-saturated stream line 112. The stream 112 is clarified liquid which has undergone a gas saturation process. A suitable pump for this process is an EDUR DAF pump, model No. LBUX602E162L from the EDUR Company of Germany. The waste stream and the gas-saturated stream mix in the contact chamber 108, before being discharged into the separator vessel 100.

The vessel 100 further may include a distribution baffle 114. The distribution baffle 114 is located opposite of the end of the contact chamber 108 which empties into the vessel 100. In this manner, the stream leaving the contact chamber 108 impinges on the distribution baffle 114. The distribution baffle 114 provides for the dissipation of energy and for the more uniform radial distribution of the combined waste and gas-saturated steams 110 and 112, respectively, into the vessel 100.

The vessel 100 may further include an outlet ring 116. The outlet ring 116 is defined by a shape which is best described as a hollow tube which has been bent into a circle so that both ends meet. In one embodiment, the outlet ring 116 can be interior of the vessel wall. In another embodiment, the outlet ring 116 can be provided on the exterior of the vessel wall. The outlet ring 116 includes a plurality of apertures 136 spaced along the inner circumference of the ring 116. In this manner, the intake of the clarified liquid is more evenly distributed from around the circumference of the vessel 100. The outlet ring 116 may be located below the exit of the contact chamber 108 to avoid the entrainment of solids. The outlet ring 116 has an exit for the plurality of apertures. The outlet ring 116 is connected to saturator pump suction line 118 at the exit. Line 118 has a connection to the clarified liquid effluent line 122 before the saturator pump 124. Clarified liquid effluent line 122 has a control valve 120 for controlling the level of the solids blanket interface. Alternatively and/or additionally vessel 100 may include a clarified liquid effluent line 152 and control valve 154. Further description of the control scheme of the separator apparatus is described in more detail below. Line 118 also leads to the gas saturated stream line 112 via the saturator pump 124. In this manner, clarified liquid is removed from the vessel 100, part is removed from the system and part is recycled to the contact chamber 108 where it mixes with the incoming waste stream from line 110. The saturator pump 124 mixes air or any other suitable gas with the recycled liquid for the saturation of the liquid with the air or gas. Reagents may be added to the saturator pump suction or discharge for the removal of nutrients or colloidal material. Reagents may include inorganic salts of iron, aluminum, magnesium, calcium or organic polymer.

Bottom nozzle 106 is connected to a solids effluent line 126. Solids effluent line 126 is arranged to deliver solids to a suitable location. Solids effluent line 126 may also deliver liquids to a suitable location via a "T" in the line to clarified liquid effluent line 122. Solids effluent line 126 has a control valve 128 for controlling the emptying of the vessel 100 at specific times. For example, when the float blanket reaches a predetermined depth value 128 is activated to direct liquid and solids emptying. The use of solids effluent line control valve 128 will be described more fully below. Influent stream line 110 may also have a control valve 138 to control the desired amount of flow to the vessel 100 or to completely shut off the flow to the vessel 100.

In one embodiment, the separator apparatus 100 includes an interface detector 130. The interface detector 130 is used, in one embodiment to monitor the interface of the float blanket in vessel 100. The interface detector 130 can be any instrument suitable to detect a liquid/solids interface, including an optical sensor. The vessel 100 may further include a plurality of level transmitters or high and low level switches, all of conventional construction. Such instrumentation may be used in the control of various parameters in the vessel, such as the accumulated solids blanket depth or height above the interface, the clarified liquid level, the emergency blocking of all valves and the stopping of all pumps, for example. The separator vessel 100 is provided with instrumentation for measuring the float blanket parameters and controlling the operation of the vessel based on the accumulated float blanket depth.

In one embodiment, the separator apparatus 100 includes a three-way valve 134 located on the solids effluent line 126. The three-way valve 134 is configured to have one inlet which can be diverted to two outlets. In one embodiment, the three-way valve 134 can be lined up to have the inlet from the solids effluent line 126 lined up to flow into the clarified liquid effluent line 122 downstream of the clarified liquid effluent control valve 120. In another embodiment, the solids effluent line 126 can be lined up to a further processing section for the treatment of solids. The three-way valve 134 can be automated to switch from multiple settings by signals generated from any of the aforementioned instruments.

In one embodiment, the separator apparatus 100 includes a turbidity meter 132 located at the bottom nozzle 106. Turbidity meter 132 is for measuring the turbidity of the material leaving the bottom nozzle 106. Turbidity meter 132 can be used to indicate clarified liquid or solids-containing liquids to direct the operation of the control valve 128, or to direct the operation of the three-way valve 134.

In another embodiment, the separator apparatus 100 includes a flush cleaning system 150 for cleaning the tank walls mixing chamber 108, effluent ring 116, and the various control instruments.

In practice, one advantageous control scheme is in batch mode. Solids accumulate until a float blanket of predetermined depth is achieved. In one embodiment, the float blanket depth may be 3 feet or greater, or 3 feet to 12 feet. In one embodiment, influent stream control valve 138, solids effluent line control valve 128, and clarified liquid effluent control valve 120 are closed after having filled the separator vessel 100 with clean water to the low level switch 140. Upon initiation of a storm flush, or any other event, a storm water pump (not shown), begins pumping a waste stream to the separator apparatus 100 via line 110. Waste influent stream control valve 138 may be used to control the flow of the incoming influent stream 110. However, in other instances, influent stream control valve 138 may run wide open and is basically operated as a block valve, either open or closed, but not as a throttle valve. The influent stream with liquids and solids from line 110 leads to the contact chamber 108. The saturator pump 124 starts operation and begins recycling clarified liquid from the intake of the outlet ring 116 at the pump suction or from another vessel. The pump 124 discharges into the line 112 connected to the contact chamber 108 where it mixes with the waste influent stream 110 containing liquids and solids. Saturator pump 124 can be started before, after, or substantially simultaneously with the opening of the influent stream control valve 138. In one embodiment, the distribution baffle 114 deflects the discharge from the contact chamber 108 radially in all directions of the separator vessel 100. Solids begin to accumulate into a float blanket at the liquid surface. The float blanket accumulates above the interface detector 130. In one embodiment, the interface detector 130 sends signals to control the clarified liquid effluent control valve 120 which maintains the bottom of the float blanket at the desired location by removing clarified liquid from the separator vessel 100 at a rate sufficient to maintain the bottom of the float blanket at the desired level. In another embodiment, the control valve can control the liquid level in the vessel 100.

Figure 5:
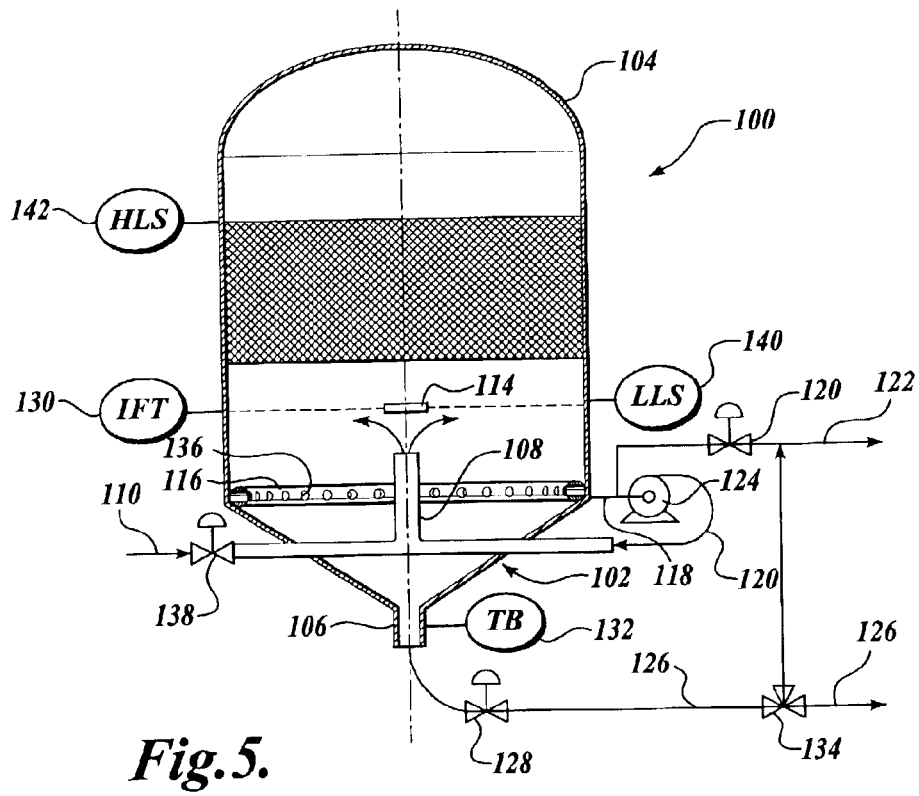
FIG. 5 shows an illustration of an embodiment of a solids accumulating flotation separator according to the present invention.

Solids will begin to accumulate within the separator vessel 100 until the float blanket reaches the desired depth as illustrated in FIG. 5 by the instrument 142. This depth can be detected by any one of a plurality of instrumentation, such as level transmitters, level switches, and the like, which indicate the proper depth of the float blanket has been reached. Alternatively, the level of liquid is maintained at a constant height, and the lower interface of the solids float blanket can be monitored for the predetermined float blanket depth.

Figure 6:
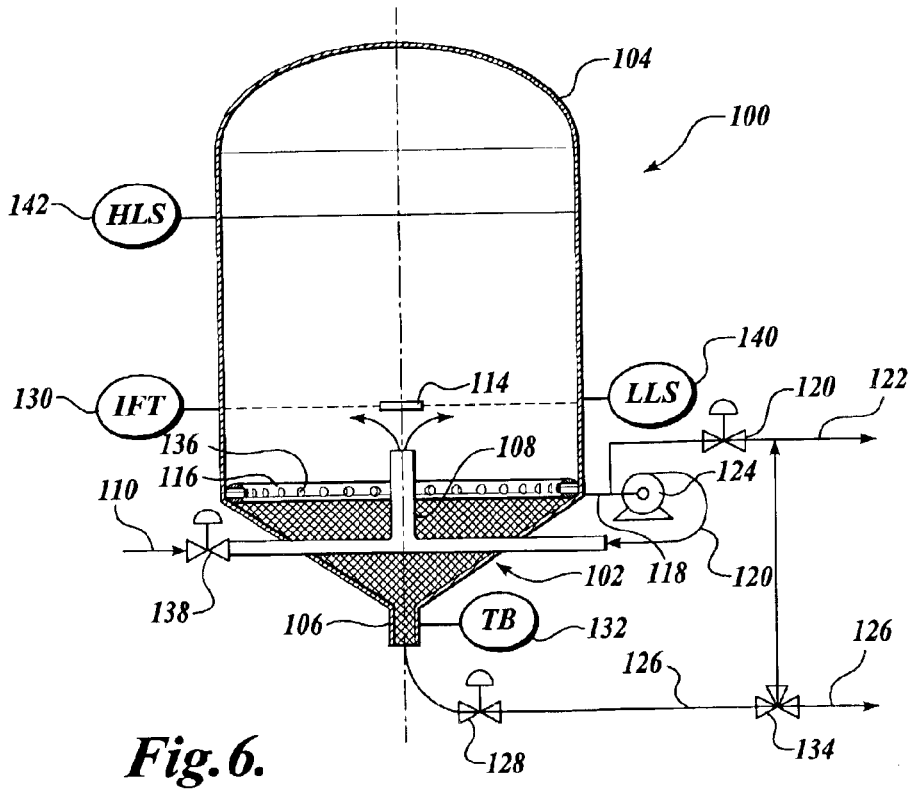
FIG. 6 shows an illustration of an embodiment of a solids accumulating flotation separator according to the present invention.

Once the float blanket has reached a predetermined depth, as measured by an interface meter, low or high level switch, or a level transmitter or any other suitable instrument, the control valve 138 can be completely closed. The saturator 124 can alternately be shut down and the control valve 120 can be closed as well. The solids effluent control valve 128 is opened to drain the separator 100. The liquid is discharged to either the clarified liquid effluent line 122 or to the concentrated solids line 126 through the operation of the three-way valve 134 controlled by the turbidity sensor 132 or timer. Once all liquid is drained from the vessel 100, the float blanket solids are removed as illustrated in FIG. 6. The system can then be cleaned by a variety of spray nozzles prior to filling in preparation for the next cycle.

However, other embodiments can use different control schemes based on the float blanket having reached a predetermined depth. In one particular embodiment, once the float blanket reaches the predetermined depth, the influent stream control valve 134 is closed.

In another embodiment, once the control valve 134 is closed, the clarified liquid effluent control valve and the separator pump 124 can remain in operation. Alternatively, the clarified liquid control valve and the separator pump 124 can be shut down.

In another embodiment, the clarified liquid effluent control valve 120 and the saturator pump 124 maintain operation to bring the float blanket level down to the intakes of the outlet ring 116.

In another embodiment, the clarified liquid effluent control valve 120 and the saturator pump 124 are shut down when the influent stream control valve 134 is closed.

In another embodiment, with the influent stream control valve 134 closed, the solids effluent control valve 128 can be opened to remove any solids which are denser than the liquid which accumulate at the bottom hopper section 122 of the separator vessel 100. The clarified liquid above the bottom solids can be discharged to the clarified liquid effluent line 122 or to the solids effluent line 126 by operation of the three-way valve 134. The bottom solids can be discharged through a separate sewer system, storage tank, or in the case of a combined sewer overflow, returned to the sewer line under low flow conditions. The float blanket solids are also removed via the solids effluent line 126.

Figure 7:
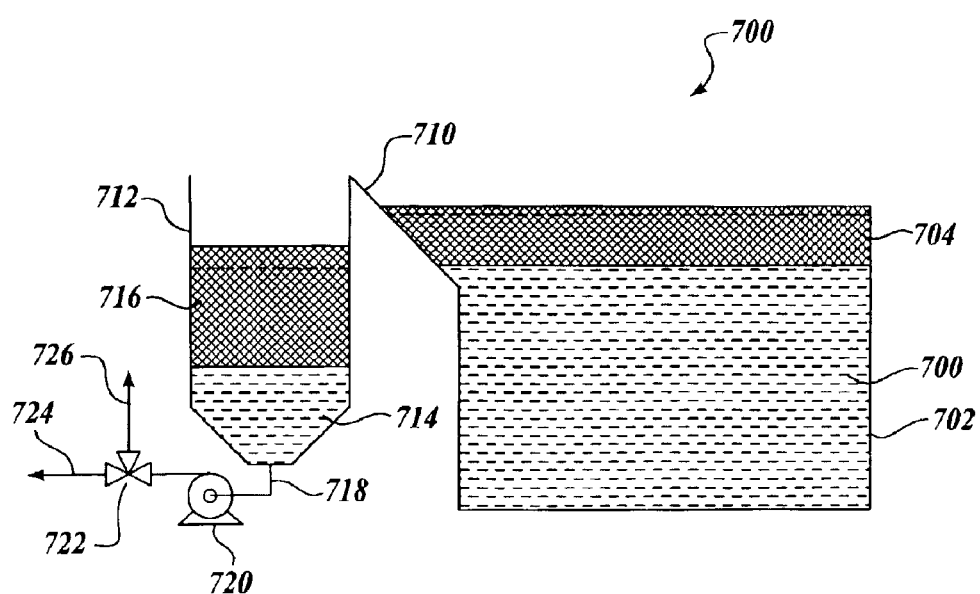
FIG. 7 shows an illustration of an embodiment of a solids re-flotation separator according to the present invention.

Referring now to FIG. 7, a further embodiment of the present invention is illustrated. The solids removal of conventional flotation separators having mechanical scrapers of a predetermined height can be improved by re-floating the solids in an additional vessel. The system 700 according to the present invention utilizes a conventional flotation separator vessel 702. The conventional flotation separator vessel 702 includes a mechanical scraper located at the upper portion of the vessel 702. Mechanical scrapers are well-known mechanical devices used in flotation separators. The flotation separator vessel 702 includes a discharge ramp 710. The float blanket 704 includes a mixture of solids and liquid.

As the scraper removes float blanket mixture up the ramp 710, in addition to removing solids, entrained liquid is carried up the ramp and into the re-flotation vessel 712. Therefore, there is a need to re-float solids gathered from conventional floatation separators. Toward that end, in one embodiment, according to the invention, an apparatus and method for re-floating solids is provided. The system 700 includes a re-flotation vessel 712 downstream of the solids ramp 710, so as to enable the collection of solids 704 with any entrained liquid. The re-flotation vessel 712 includes a hopper with a cone or tapered bottom portion 714 connected to a cylindrical portion 716 or standpipe. The conical portion 714 is connected to an outlet 718 at a low point in the tapered section 714. The outlet 718 may be connected to the suction side of pump 720 or simply discharged by gravity. The discharge of pump 720 is connected to a three-way valve 722 having a single inlet and two outlets or a multiplicity of valves having the same function. One outlet can be directed to a clarified liquid line 724, while a second outlet can be directed to a solids line 726. A turbidity meter located at the outlet line 718 can be used to control the three-way valve 722 line-up position. An interface detector, or level indicating instrument can be used to monitor the float blanket depth in the re-flotation vessel 712.

In operation, the float blanket mixture deposited into re-flotation vessel 712 is allowed to reside within re-flotation vessel 712 for any length of time in order to cause the separation of clarified liquids and the re-floated solids. Alternatively, the float blanket accumulated in vessel 712 can be measured and controlled, so as to empty the vessel 712, when the float blanket reaches a predetermined depth. In this manner, the removed solids concentration is increased as compared with the conventional flotation separator standing alone.

Re-flotation vessel 712 can be of any suitable height and diameter. Re-flotation vessel 712 can be fitted with suitable instrumentation, such as, but not limited to level meters, high and low level switches, interface detectors, density meters, and the like to provide for the adequate monitoring of the processes taking place within the re-flotation vessel 712. Additionally, any number of pumps or valves and piping configuration can be utilized.

One or more re-flotation vessels 712 can be provided in parallel or in series as required to provide for the continuous operation of the system.

In another embodiment, the separator can be operated to process a continuous flow as a sequencing batch reactor. Each separator can be filled with clean or process liquid to the starting liquid level or low level switch 140 utilizing the effluent from another separator. When operating in a sequencing batch mode, the cycle duration will greatly exceed the solids clean time ($\Delta_{SC}$) of a conventional separator. At equal solids clean times ($\Delta_{SC}$) the solids concentration ($\gamma_{FB}$) in the solids accumulating separator should be greater than the conventional flotation separator due to the greater depth and compression of the float blanket. The improved loading rate will equal the higher concentration multiplied by a substantially greater float blanket depth.

Figure 8:
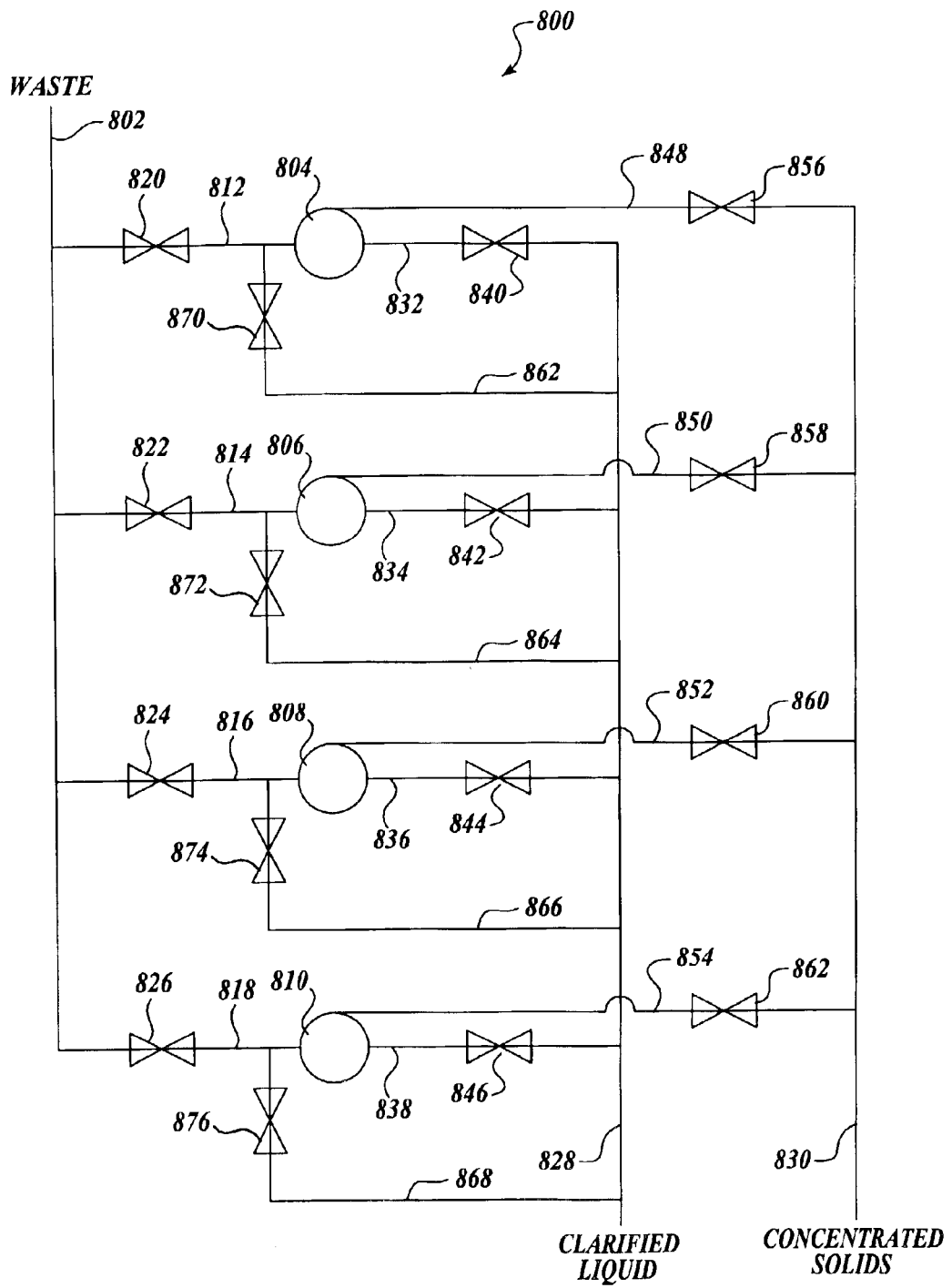
FIG. 8 shows an illustration of an embodiment of a system of solids accumulating flotation separators according to the present invention.

Referring now to FIG. 8, a sequencing batch system incorporating several of the separator vessels 100 described above is illustrated. It is to be readily appreciated that the individual vessels 804, 806, 808, and 810, are not shown having the ancillary equipment, such as pumps, instruments, valves, etc., but which are clearly understood to be present.

In one embodiment, the system 800 includes the four separator vessels 804, 806, 808, and 810, in parallel. A waste header 802 has branch connections 812, 814, 816, and 818 leading to each of the respective separator vessels. Valves 820, 822, 824, and 826 are provided on each of the branch headers, respectively. A clarified liquid header 828 is provided to carry the clarified liquid effluent from each of the respective separator vessels. A concentrated solids header 830 is provided to carry the concentrated solids from each of the respective separator vessels. Lines 832, 834, 836, and 838 leading from vessels 804, 806, 808, and 810, respectively, empty into the clarified liquid header 828. Valves 840, 842, 844, and 846 are provided on the lines 832, 834, 836, and 838, respectively. Lines 848, 850, 852, and 854 leading from vessels 804, 806, 808, and 810, respectively, empty into the concentrated solids header 830. Valves 856, 858, 860, and 862 are provided on the lines 848, 850, 852, and 854, respectively. It is to be appreciated that vessels 804, 806, 808, and 810, can either empty into each header 828 or 830, and likewise take material from the headers 828 and 830.

Towards this end, vessel 804 includes a clarified liquid filling line 862 from the clarified liquid header 828. A valve 870 is located on the line 862. Vessel 806 includes a clarified liquid filling line 864 from the clarified liquid header 828. Valve 872 is located on line 864. Vessel 808 includes a clarified liquid filling line 866 from the clarified liquid header 828. Valve 824 is located on the line 866. Vessel 810 includes a clarified liquid filling line 868 from clarified liquid header 828. Valve 876 is located on the line 868.

In operation, each of the separator vessel can be in a different mode of operation. In one embodiment, separator vessel 804 is on standby mode as a spare in the event that any of the other separator vessels 806, 808, or 810 are in need of maintenance. The vessel 806 can be in the accumulating mode, while vessel 808 is in the emptying mode, while vessel 810 is in the filling mode. The vessels may be operated simultaneously, each one being in a different mode.

Operation is made simpler by automating the valves. For example, in the embodiment just described, separator vessel 804 has its waste branch header valve 820, clarified liquid effluent valve 840, and concentrated solids effluent valve 856 in the closed position. The separator vessel 806 has its waste branch header valve 822 and its clarified liquid effluent valve 842 both open. Separator vessel 806 is in the accumulating mode, thus waste stream is entering the separator vessel 806 while clarified liquid effluent is leaving the separator vessel 806, and while solids are accumulating into a float blanket in the separator vessel 806. The concentrated solids effluent valve 858 is in the closed position.

The separator vessel 808 is in the emptying mode. The waste branch header valve 824 and the clarified liquid effluent valve 844 are both in the closed position. The concentrated solids effluent valve 860 is in the open position. When the separator vessel 808 is in the emptying mode, a three-way valve (not shown) can be used to direct the flow of the contents of the vessel 808 based on a turbidity meter (not shown). If clarified liquid is being emptied from the separator vessel 808, then the three-way valve is lined up to the clarified liquid header 828. Alternatively, if concentrated solids are being emptied from the separator vessel 808, the three-way valve is lined up to the concentrated solids header 830.

Separator vessel 810 is in the filling mode. The waste branch header valve 826 and the concentrated solids effluent valve 862 are both closed. The clarified liquid effluent valve 846 is open for as long as it takes to fill the separator vessel 810 with its initial liquid level. Clarified liquid to the separator vessel 810 comes from the clarified liquid header 828. Any clarified liquid put into the header 828 by vessels 806 or 808 can be withdrawn from the header 828 and sent to the separator vessel 810 by opening the valve 846.

When the separator vessel 806 has reached a predetermined float blanket depth, the separator vessel 806 can go into the emptying mode. The separator vessel 808 can, if the circumstances permit, go into the filling mode, while the separator vessel 810 can, if circumstances permit, go into the accumulating mode. The system according to the present invention achieves continuous waste stream processing.

While the system 800 has been shown having four separator vessels, it is to be readily appreciated that other systems in accordance with the invention can have more or less separator vessels, depending on a number of circumstances which are dependent on the ultimate use of the system.

Figure 9:
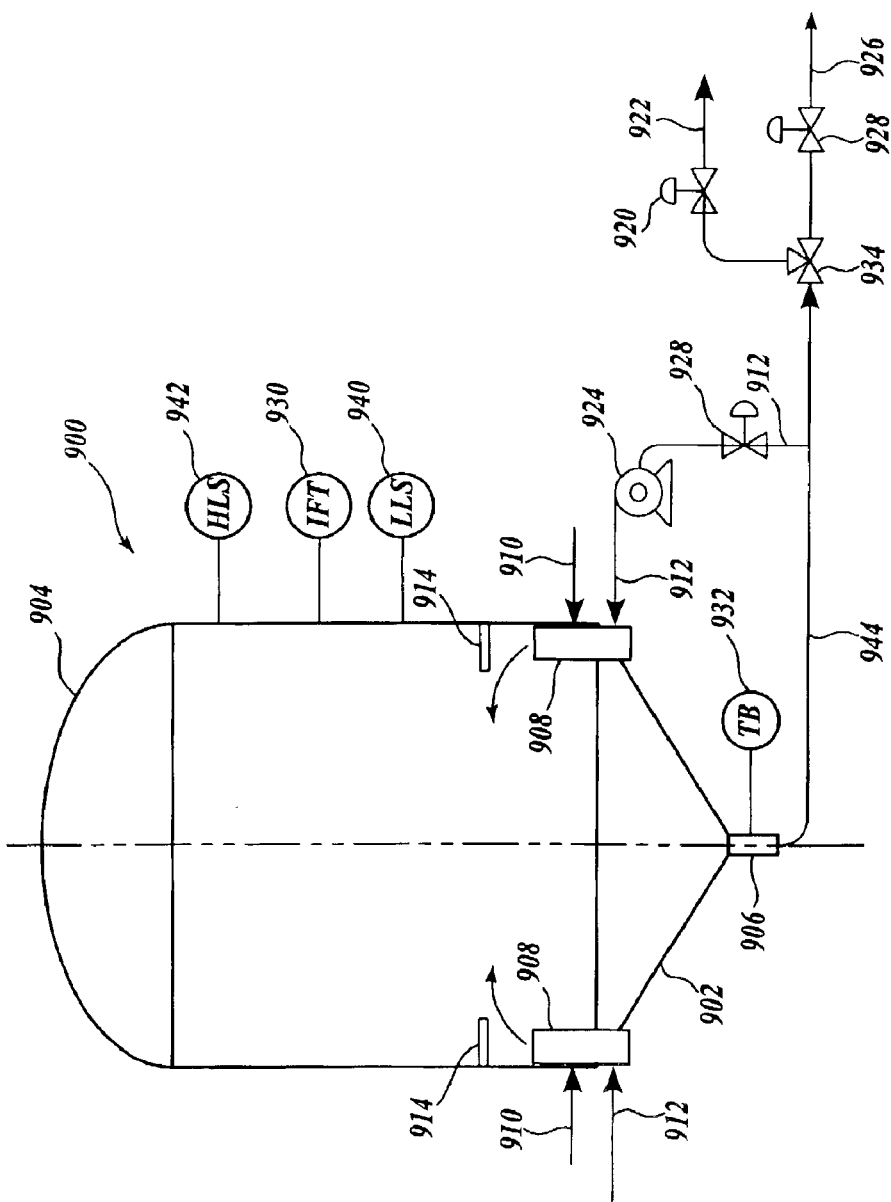
FIG. 9 shows an illustration of an embodiment of a solids accumulating flotation separator according to the present invention.

Referring now to FIG. 9, an embodiment of a solids accumulating flotation apparatus is illustrated. The system includes a vessel 900 having a domed upper portion 904, and a cone shaped bottom portion 902. A nozzle 906 is located at the center of the cone bottom 902. A turbidity meter 932 can be located at the nozzle 906. The vessel 900 is cylindrical in configuration but can have any shape suitable to contain liquids and solids. The vessel 900 includes any number of inlet contact chambers 908 located around the lower portion of the vessel 900, at the approximate location wherein the cylindrical body meets the cone bottom. The inlet chambers 908 are hollow conduits adjacent the vessel interior wall. The inlet chambers 908 have influent stream addition points for waste stream 910. The inlet chambers 908 also have gas saturated liquid addition points for stream 912. The inlet chambers have outlets on an upper side thereof. A baffle 914 may be located a spaced distance from the boxes' outlets. The baffles 914 are located adjacent to the interior vessel walls. The baffles 914 redirect the streams exiting the inlet boxes 908.

An effluent line 944, is connected to the vessel nozzle 906. Line 944 branches into line 912 which is the gas saturated liquid line. Line 944 also branches into line 922 which is the clarified liquid effluent line and line 926 which is the solids effluent line. A three way valve 934 is located downstream from the branch to the line 912. A control valve 920 may be located on the clarified liquid effluent line 922. A control valve 928 may be located on the solids effluent line 926. Line 912 which branches from line 944 ahead of the three-way valve 934 has a control valve 928 located ahead of the saturator 924. Saturator 924 in principle operates as the previously described saturator pump, and discharges into the inlet boxes 908.

In operation, the influent stream 910 enters the inlet chambers 908 after a suitable minimum level has been established in the vessel 900. The saturator pump 924 can be started once a level is established. Saturator pump control valve 928 may be programmed to control the flow to the saturator pump 924, or alternatively the level in the vessel 900. Alternatively, the saturator pump control valve 928 may block all flow to the saturator pump when the saturator pump is shut off. Saturator pump control valve 928 may run wide open just prior to and during the operation of saturator pump 924. Stream 912 is gas saturated from the saturator pump 924 forward. The gas saturated liquid stream 912 and the influent waste stream 910 mix in the inlet chambers 908 and are expelled through a top opening in the inlet chambers 908. The liquids may impinge on the baffles 914 which redirect the liquids towards the center of the vessel 900.

During operation of the vessel 900, while the influent stream is feeding the vessel 900, the clarified liquid effluent control valve 920 can be controlling the liquid level within the vessel 900. In this manner, constant feeding occurs simultaneously with clarified liquid withdrawal from vessel 900.

Solids begin accumulating in the vessel 900. The depth of the float blanket is measured with instrumentation. Such instrumentation can include high level switches 942, level meters, or interface detector transmitters 930. However, any other suitable instrument capable of measuring the depth or level of a float blanket is suitable for use in this application. Once the float blanket depth reaches a predetermined depth, the influent waste stream 910 can be shut off. The saturator pump 924 can also be shut off at this time. The saturator pump control valve 928 can close. The three way valve 934 is lined up to go to the clarified liquid effluent line 922. The clarified liquid effluent control valve 920 can open to draw down the clarified liquid from the vessel 900. When the bottom of the float blanket reaches the nozzle 906, the turbidity meter will sense the lower boundary of the float blanket solids. At this time, the clarified liquid effluent control valve 920 can close. The three way valve 934 can change position and be lined up to go to the solids effluent line 926. The solids effluent control valve 928 will open to draw down the float blanket solids and empty the vessel 900. Vessel 900 can then be washed and prepared for the next cycle.

EXAMPLE 1

A solids accumulating separator according to the present invention was operated on two occasions at the Don Aardema Dairy in Wendell, Id. At the Aardema Dairy, flush manure is first processed through a FAN separator to remove coarse solids. The liquid is then processed through a gravity separator. Liquid from the gravity separator was processed in the solids accumulating separator of the present invention.

Both the influent liquid (Column (2)) to the solids accumulating separator and the clarified liquid effluent (Column (3)) from the separator were analyzed. The thickened solids (Column (5)) were also analyzed. Table 1 shows the results, wherein Column (4) is the percent removed for various constituents of the influent feed stream.

TABLE 1

| Column (1) | Column (2) Influent Concentration (mg/L) pH = 6.85 | Column (3) Liquid Effluent Concentration (mg/L) pH = 7.13 | Column (4) Removal (%) | Column (5) Solids Concentration (mg/L) pH = 6.38 | Column (6) Increase (%) |
|---|---|---|---|---|---|
| Suspended Solids | 7,440 | 3,030 | 59.27 | — | |
| COD | 15,100 | 4,900 | 67.55 | 92,000 | 509.27 |
| TKN | 1,600 | 400 | 75.0 | 4,000 | 150 |
| Ammonia | 307 | 139 | 54.7 | 213 | — |
| Total P | 132 | 27 | 80 | 790 | 498 |
| Sulfide | 7.7 | 3.3 | 57.1 | 12.5 | 62 |

The solids accumulated into a float blanket, were concentrated and subsequently removed. The thickened solids contain substantially higher concentrations than the influent. Column (6) of Table 1 shows the percentage increase in concentration of the influent compared to the thickened solids for respective constituents of the influent feed stream. The separator removed a significant percentage of the pollutants and concentrated the pollutants in a thick viscous slurry. Significant removal of odor causing substances such as ammonia and sulfide occurred. Both substances were discharged with the gas stream overheads since accumulation was not detected or minimal in the float solids blanket.

The solids accumulating flotation separator according to the invention was operated on separate occasions with two waste streams, with dilute waste coming after the FAN and gravity separators and with concentrated waste after the FAN separator but before the gravity separator. The operating results established the surface loading rates shown below in Table 2. The operating loadings were considerably greater than the loadings of conventional separators which operate at a loading of 35 lbs/ft$^2$/day.

TABLE 2

| Column (1) | Column (2) Dilute Waste After FAN and Gravity Separator | Column (3) Dilute Waste After FAN and Gravity Separator | Column (4) Concentrated Waste After FAN Separator |
|---|---|---|---|
| Solids Concentration | 0.75% | 0.75% | 2.0% |
| Flow (gpm) | 9.2 | 15.3 | 11.5 |
| Flow with sat (gpm/ft$^2$) | 3.1 | 3.8 | 3.4 |
| Depth of Blanket (ft) | 6.0 | 6.0 | 6.0 |
| Run time (hrs) | 5 | 3 | 1.5 |
| Cycles per day | 4.7 | 7.8 | 15.6 |
| Loading (lb/ft$^2$/day) | 52 | 105 | 175 |

COMPARATIVE EXAMPLE 2

Referring now to Table 3, a theoretical comparison of a conventional mechanical solids flotation separator of the Southwest Suburban Sewer District of Burien, Wash., is made with a hypothetical solids accumulating flotation separator according to the present invention.

The conventional mechanical separator at Southwest Suburban has an area of 254 ft$^2$ and removes solids by using a rotating mechanical scraper. The solids accumulating separator of Column (3) has been modeled using the same area as the conventional separator. The influent solids concentration is 0.5%. The solids removal of a conventional mechanical separator is limited by the height of the mechanical scraper, as evidenced also by its low hydraulic loading. Accordingly, only a 0.5 ft. float blanket is achieved by the conventional flotation separator. This results in 24 cycles per day or the cleaning of the surface every hour. The dry solids removal rate is 6.7 lbs/min Accordingly, the solids loading is 38 lbs/ft$^2$/day. In comparison, the solids accumulating flotation separator having the same square foot area without mechanical separators can process 20.11 lbs/min of dry solids. Accordingly, a solids loading of 114 lbs/ft$^2$/day is theoretically achievable. In this case, the solids accumulating flotation separator would have a blanket depth of 8 feet which results in only five cycles per day. Column (4) shows a solids accumulating flotation separator which has been sized to process the same amount of influent waste flow as the conventional separator in a tank having 33% of the area. In this case, the smaller solids accumulating flotation separator has a solids loading of 123 lbs/ft$^2$/day, and a solids removal rate of 6.7 lbs/min which matches the conventional mechanical flotation separator. By removing the mechanical scrapers, and allowing solids to accumulate to greater depths, the cycles per day are reduced, and the solids loading rate can be increased significantly. Alternatively, the flotation separator can be reduced in size.

TABLE 3

| Column (1) | Column (2) Conventional | Column (3) Solids Accum. | Column (4) Solids Accum. Smaller Unit |
|---|---|---|---|
| Area (sf) | 254 | 254 | 79 |
| Flow Rate (gpm) | 160 | 480 | 160 |
| Flow Rate (gpd) | 230,400 | 691,200 | 230,400 |
| Influent Solids Concentration (%) | 0.5 | 0.5 | 0.5 |
| Loading (gpd/ft$^2$) | 906 | 2,718 | 2,935 |
| Loading (gpm/ft$^2$) | 0.63 | 1.89 | 2.04 |
| Solids Load (lb/day) | 9,654 | 28,961 | 9,654 |
| Solids Loading (lb/ft$^2$/day) | 38 | 114 | 123 |
| Float solids Concentration (%) | 5 | 5 | 5 |
| Float solids flow (gpd) | 23,040 | 69,120 | 23,040 |
| Float solids flow (ft$^3$) | 3,080 | 9,241 | 3,080 |
| Blanket Depth (ft) | 0.5 | 8.0 | 2.0 |
| Cleaning Volume (ft$^3$) | 127 | 2,035 | 157 |
| Cycles per day | 24 | 5 | 19.6 |
| Cycles per hour | 1.0 | 0.2 | 0.8 |
| Hydraulic loading (gpm/ft$^2$) (<4 max) | 1.22 | 3.66 | 3.95 |

COMPARATIVE EXAMPLE 3

Referring now to Table 4, a second comparative example between a conventional mechanical flotation separator and a hypothetical solids accumulating flotation separator of the invention is shown. In this example, the influent solids concentration has been raised from 0.5% in the previous example to 1%. The solids loading value remains the same for the conventional mechanical separator as in the previous example since the rate limiting step is solids removal. However, the solids accumulating separator is generally not constrained by solids removal, but rather by its hydraulic load. Accordingly, the solids accumulating separator can operate at higher solids surface loading rates than conventional mechanical flotation separators. Also shown is a solids accumulating flotation separator sized to process the same amount of flow to the conventional mechanical flotation separator. While the conventional mechanical flotation separator requires 254 square feet of area to process a flow rate of 115,200 gal/day at 1% solids concentration, the smaller solids accumulating flotation separator only requires 79 ft$^2$ of area to process the same amount of flow.

TABLE 4

| Column (1) | Column (2) Conventional | Column (3) Solids Accum. | Column (4) Solids Accum. Smaller Unit |
|---|---|---|---|
| Area (sf) | 254 | 254 | 79 |
| Flow Rate (gpm) | 80 | 240 | 80 |
| Flow Rate (gpd) | 115,200 | 345,600 | 115,200 |
| Influent Solids Concentration (%) | 1 | 1 | 1 |
| Loading (gpd/ft$^2$) | 453 | 1,359 | 1,468 |
| Loading (gpm/ft$^2$) | 0.31 | 0.94 | 1.02 |
| Solids Load (lb/day) | 9,654 | 28,961 | 9,654 |
| Solids Loading (lb/ft$^2$/day) | 38 | 114 | 123 |
| Float solids Concentration (%) | 5 | 5 | 5 |
| Float solids flow (gpd) | 23,040 | 69,120 | 23,040 |
| Float solids flow (ft$^3$) | 3,080 | 9,241 | 3,080 |
| Blanket Depth (ft) | 0.5 | 8.0 | 2.0 |
| Cleaning Volume (ft$^3$) | 127 | 2,035 | 157 |
| Cycles per day | 24 | 5 | 19.6 |

TABLE 4-continued

| Column (1) | Column (2) Conventional | Column (3) Solids Accum. | Column (4) Solids Accum. Smaller Unit |
|---|---|---|---|
| Cycles per hour | 1.0 | 0.2 | 0.82 |
| Hydraulic loading (gpm/ft$^2$) (<4 max) | 0.90 | 2.71 | 2.93 |

COMPARATIVE EXAMPLE 4

Referring now to Table 5, another comparative example between a conventional mechanical flotation separator and a solids accumulating flotation separator according to the invention is shown. In this example, the influent solids concentration has been increased from 1% to 2%.

TABLE 5

| Column (1) | Column (2) Conventional | Column (3) Solids Accum. Same Size | Column (4) Solids Accum. Smaller Unit |
|---|---|---|---|
| Area (sf) | 254 | 254 | 79 |
| Flow Rate (gpm) | 40 | 120 | 40 |
| Flow Rate (gpd) | 57,600 | 172,800 | 57,600 |
| Influent Solids Concentration (%) | 2 | 2 | 2 |
| Loading (gpd/ft$^2$) | 226 | 679 | 734 |
| Loading (gpm/ft$^2$) | 0.16 | 0.47 | 0.51 |
| Solids Load (lb/day) | 9,654 | 28,961 | 9,654 |
| Solids Loading (lb/ft$^2$/day) | 38 | 114 | 123 |
| Float solids Concentration (%) | 5 | 5 | 5 |
| Float solids flow (gpd) | 23,040 | 69,120 | 23,040 |
| Float solids flow (ft$^3$) | 3,080 | 9,241 | 3,080 |
| Blanket Depth (ft) | 0.5 | 8.0 | 8.0 |
| Cleaning Volume (ft$^3$) | 127 | 2,035 | 628 |
| Cycles per day | 24 | 4.5 | 4.9 |
| Cycles per hour | 1.0 | 0.2 | 0.2 |
| Hydraulic loading (gpm/ft$^2$) (<4 max) | 0.75 | 2.24 | 2.42 |

COMPARATIVE EXAMPLE 5

Referring now to Table 6, another comparison of a conventional mechanical flotation separator with the solids accumulating flotation separator of the invention is shown. The influent solids concentration has been raised to 2.5%. The solids surface loading values remain the same for each separator.

TABLE 6

| Column (1) | Column (2) Conventional | Column (3) Solids Accum. | Column (4) Solids Accum. Smaller Unit |
|---|---|---|---|
| Area (sf) | 254 | 254 | 79 |
| Flow Rate (gpm) | 32 | 96 | 32 |
| Flow Rate (gpd) | 46,080 | 138,240 | 46,080 |
| Influent Solids Concentration (%) | 2.5 | 2.5 | 2.5 |
| Loading (gpd/ft$^2$) | 181 | 544 | 587 |
| Loading (gpm/ft$^2$) | 0.13 | 0.38 | 0.41 |
| Solids Load (lb/day) | 9,654 | 28,961 | 9,654 |
| Solids Loading (lb/ft$^2$/day) | 38 | 114 | 123 |
| Float solids Concentration (%) | 5 | 5 | 5 |
| Float solids flow (gpd) | 23,040 | 69,120 | 23,040 |

TABLE 6-continued

| Column (1) | Column (2) Conventional | Column (3) Solids Accum. | Column (4) Solids Accum. Smaller Unit |
|---|---|---|---|
| Float solids flow (ft$^3$) | 3,080 | 9,241 | 3,080 |
| Blanket Depth (ft) | 0.5 | 8.0 | 8.0 |
| Cleaning Volume (ft$^3$) | 127 | 2,035 | 628 |
| Cycles per day | 24 | 5 | 4.9 |
| Cycles per hour | 1.0 | 0.2 | 0.2 |
| Hydraulic loading (gpm/ft$^2$) (<4 max) | 0.72 | 2.15 | 2.32 |

COMPARATIVE EXAMPLE 6

Referring now to Table 7, another comparison of a conventional mechanical flotation separator with a solids accumulating flotation separator of the present invention is shown. The influent solids concentration has been raised to 3%. The solids surface loading values remain the same.

TABLE 7

| Column (1) | Column (2) Conventional | Column (3) Solids Accum. | Column (4) Solids Accum. Smaller Unit |
|---|---|---|---|
| Area (sf) | 254 | 254 | 79 |
| Flow Rate (gpm) | 27 | 80 | 27 |
| Flow Rate (gpd) | 38,400 | 115,200 | 38,400 |
| Influent Solids Concentration % | 3 | 3 | 3 |
| Loading (gpd/ft$^2$) | 151 | 453 | 489 |
| Loading (gpm/ft$^2$) | 0.10 | 0.31 | 0.34 |
| Solids Load (lb/day) | 9,654 | 28,961 | 9,654 |
| Solids Loading (lb/ft$^2$/day) | 38 | 114 | 123 |
| Float solids Concentration (%) | 6 | 6 | 5 |
| Float solids flow (gpd) | 19,200 | 57,600 | 23,040 |
| Float solids flow (ft$^3$) | 2,567 | 7,701 | 3,080 |
| Blanket Depth (ft) | 0.5 | 8.0 | 8.0 |
| Cleaning Volume (ft$^3$) | 127 | 2,035 | 628 |
| Cycles per day | 20 | 3.8 | 4.9 |
| Cycles per hour | 0.8 | 0.2 | 0.2 |
| Hydraulic loading (gpm/ft$^2$) (<4 max) | 0.69 | 2.08 | 2.25 |

A general observation from these theoretical comparative examples is that conventional mechanical flotation separators are limited by the mechanical solids removal apparatus, whereas the solids accumulating flotation separator which removes solids out the bottom is not so limited, but generally approaches or exceeds the hydraulic loading limit. Conventional mechanical separators reach their solids surface loading capacity at 0.5% solids concentration. The solids accumulating flotation separator of the invention has a greater capacity as measured by the solids surface loading.

EXAMPLE 7

Referring now to Table 8, a comparison of the float blanket depth and the cycles per day required for the particular float blanket depth is shown. Column (3) shows the percent loss of theoretical capacity as compared to an infinitely high float blanket depth. The deeper the float blanket, the less the required number of cycles and the greater the capacity of the solids accumulating flotation separator to remove solids. Accordingly, solids accumulating flotation separators are operated in a manner that seeks to have the greatest possible float blanket depth for the given vessel and system configuration. In the solids accumulating separator of the present invention, increasing the float blanket depth reduces the capacity loss (Column (3)) while increasing the solids accumulation time (24/cycles). The increased solids accumulation time also increases the float solids concentration.

TABLE 8

| Column (1) Depth | Column (2) Cycles | Column (3) % Lost |
|---|---|---|
| ∞ | 0.0 | 0.0 |
| 10 | 3.9 | 16.3 |
| 8 | 4.9 | 20.4 |
| 6 | 6.5 | 27.2 |
| 4 | 9.8 | 40.9 |
| 2 | 19.6 | 81.7 |

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of flotation separation, comprising:
   feeding solids and liquids to a vessel while removing a clarified liquid stream from the vessel;
   allowing solids to accumulate into a float blanket; and
   emptying the accumulated float blanket solids from the vessel lower portion based on the solids having formed a float blanket of a predetermined depth.

2. The method of claim 1, further comprising:
   monitoring the interface of the float blanket during the feeding step.

3. The method of claim 1, further comprising:
   monitoring the depth of the float blanket during the feeding step.

4. The method of claim 1, further comprising:
   stopping feed after the float blanket reaches the predetermined depth.

5. The method of claim 1, further comprising:
   feeding solids to achieve a solids surface loading of greater than 50 lb/ft$^2$/day.

6. The method of claim 1, further comprising:
   feeding solids to achieve a solids surface loading of greater than 100 lb/ft$^2$/day.

7. The method of claim 1, further comprising:
   accumulating a float blanket depth of greater than 1 foot before emptying the accumulated float blanket solids.

8. The method of claim 1, further comprising:
   accumulating a float blanket depth of greater than 2 feet before emptying the accumulated float blanket solids.

9. The method of claim 1, further comprising:
   allowing the float blanket to accumulate based on a predetermined amount of time.

10. A method of flotation separation, comprising:
    accumulating solids in a vessel after a float blanket mixture has been charged to the vessel; and
    emptying the accumulated float blanket solids from a vessel lower portion based on the solids having formed a float blanket of predetermined depth.

11. A method of flotation separation, comprising:
    re-flotating the solids collected from a mechanical flotation separator in a vessel; and
    emptying the re-floated solids based on the re-floated solids having formed a float blanket of pre-determined depth.

12. A method of flotation separation, comprising:
    feeding a solids/liquid stream to a vessel that empties at its periphery, while removing a clarified liquid stream from a central lower portion of the vessel;
    accumulating solids into a float blanket; and
    emptying the vessel of accumulated float blanket solids from the vessel lower portion based on the solids having formed a float blanket of a predetermined depth.

13. A method of flotation separation, comprising:
    feeding a solids/liquid stream to a vessel that empties at its center, while removing a clarified liquid stream from the periphery of the vessel;
    accumulating solids into a float blanket; and
    emptying the vessel of accumulated float blanket solids out of the vessel lower portion based on the solids having formed a float blanket of a predetermined depth.

14. A method of flotation separation, comprising:
    feeding a solids/liquid stream while removing a clarified liquid stream from a first vessel;
    accumulating solids in the first vessel;
    emptying a second vessel of an accumulated float blanket from the second vessel lower portion based on the solids having formed a float blanket of a predetermined depth; and
    filling a third vessel with clarified liquid, wherein the steps of feeding, emptying and filling may be performed simultaneously.

* * * * *